United States Patent [19]

Cosper

[11] 4,159,922
[45] Jul. 3, 1979

[54] ACCELERATED PROCESS FOR CAUSTICIZATION OF KRAFT GREEN LIQUOR

[75] Inventor: David R. Cosper, Downers Grove, Ill.

[73] Assignee: Nalco Chemical Company, Oak Brook, Ill.

[21] Appl. No.: 950,767

[22] Filed: Oct. 12, 1978

[51] Int. Cl.$^2$ .............................................. D21C 11/04
[52] U.S. Cl. .................................. 162/30 K; 423/183; 423/164; 423/265; 423/641; 423/DIG. 3
[58] Field of Search ........................... 162/30 R, 30 K; 423/164, 165, 432, 641, 265, 183, DIG. 3; 252/180; 260/502.5, 502.4 R; 210/58

[56] References Cited

U.S. PATENT DOCUMENTS

| 3,269,941 | 8/1966 | Le Compte et al. | 423/432 |
| 3,832,396 | 8/1974 | Irani et al. | 162/158 |
| 3,959,168 | 5/1976 | Germscheid et al. | 210/58 |
| 4,018,877 | 4/1977 | Woode | 423/165 |

*Primary Examiner*—S. Leon Bashore
*Assistant Examiner*—William F. Smith
*Attorney, Agent, or Firm*—John G. Premo; Robert A. Miller; John S. Roberts, Jr.

[57] ABSTRACT

In the alkaline pulping of cellulose and particularly in the step wherein green liquor is converted to white liquor by causticizing or the addition of calcium hydroxide, it has been found that the addition of any of three specially selected organic phosphonate reagents, namely, nitrilotris(methylenephosphonic acid) (Dequest 2000); 2-phosphonobutane-1,2,4-tricarboxylic acid (Bayer PBS-AM); and hexamethylenediaminetetrakis(methylenephosphonic acid) (Nalco 7691/Dequest 2051), accelerates the speed of the reaction to the right. These acid compounds and their soluble alkali metal and ammonium salts have proved effective in increasing the acceleration rate to the right of the causticizing reaction and the production of the titratable sodium hydroxide

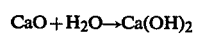

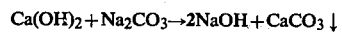

These additives give up to a 2–4% increase in causticizing conversion to NaOH when applied at 0.5–2% active based on the theoretical yield of calcium carbonate and this has been observed above the usual percent conversion ranging from 85–90%. Other materials including other phosphonates such as 1-hydroxyethylidenediphosphonic acid (Dequest 2010) and sodium poly(α-hydroxy-acrylate) were not active or retarded activity as to acceleration.

5 Claims, No Drawings

ACCELERATED PROCESS FOR CAUSTICIZATION OF KRAFT GREEN LIQUOR

In the alkaline pulping of cellulose and particularly in the step wherein green liquor is converted to white liquor by causticizing or the addition of calcium hydroxide, it has been found that the addition of any of three specially selected organic phosphonate reagents, namely, nitrilotris(methylenephosphonic acid) (Dequest 2000); 2-phosphonobutane-1,2,4-tricarboxylic acid (Bayer PBS-AM); and hexamethylenediaminetetrakis(methylenephosphonic acid) (Nalco 7691/Dequest 2051), accelerates the speed of the reaction to the right. These acid compounds and their soluble alkali metal and ammonium salts have proved effective as additives in increasing the rate to the right of the causticizing reaction and the production of titratable sodium hydroxide $$CaO + H_2O \rightarrow Ca(OH)_2$$

$$Ca(OH)_2 + Na_2CO_3 \rightarrow 2NaOH + CaCO_3 \downarrow$$

These additives give up to a 2-4% increase in causticizing conversion to NaOH when applied at 0.5-2% active based on the theoretical yield of calcium carbonate and this has been observed above the usual percent conversion ranging from 85-90%. Other materials including other phosphonates such as 1-hydroxyethylidenediphosphonic acid (Dequest 2010) and sodium poly(α-hydroxy-acrylate) were not active or retarded activity as to acceleration.

PRIOR ART STATEMENT

I. J. W. Johnston et al, "Chemical Conversion of Smelt," Chapter 4 in *Chemical Recovery in Alkaline Pulping Processes*, R. P. Whitney, ed., TAPPI Monograph Series No. 32, 1968.

J. N. Swartz et al, "Alkaline Pulping," Chapter 9 in *The Pulping of Wood*, Vol. 1, 2d ed., MacDonald and Franklin, eds., 1969, pp. 562-567.

J. C. Olren and O. G. Diringa, "Settling Rate of Calcium Carbonate in the Causticizing of Soda Ash," *Ind. Eng. Chem.*, 33:204-218 (1941).

K. A. Kobe and J. A. Wilkinson, "Effect of Sulfur Compounds in the Causticizing Equilibrium," *Ind. Eng. Chem.*, 45:307-313 (1953).

TAPPI Method T624, os-68, "Analysis of Soda and Sulfate White and Green Liquors."

Casey, *Pulp and Paper Chemistry and Chemical Technology*, Vol. 1, Interscience, 1960, pp. 265-278.

U.S. Pat. No. 3,959,168 Germschied et al notes a synergistic sequestering agent composition which contains an aminotrimethylene phosphonic acid, 2-phosphonobutane 1,2,4-tricarboxylic acid, and a related ethylenediaminetetramethylene phosphonic acid.

In the alkaline pulping of cellulose the spent cooking liquor from the digesters plus the filtrate from the washing operation is commonly known as black liquor. This black liquor contains practically all the alkali originally added together with over half the original weight of the wood. This black liquor is then sent to an alkali recovery plant where it is evaporated, concentrated, and burned in a furnace. The furnace of the recovery unit discharges a molten ash or smelt to the main dissolving tank in which the smelt is dissolved to form green liquor. The present invention relates to the following step where lime is added to convert the carbonate to sodium hydroxide and this process of converting carbonate to sodium hydroxide is referred to as causticizing and produces white liquor.

In widely used parlance, however, the causticizing process is generally considered to involve the reaction of lime with green liquor to produce hydroxide-containing white liquor and by-product calcium carbonate which is calcined to regenerate lime. This causticizing reaction also changes the reaction milieu from green liquor, whose color is produced by iron compounds, to white liquor. Limestone is a by product of the reaction since the main objective of causticizing in the mill is to convert carbonate to hydroxyl ion. It has been calculated that, even under the best conditions, the reaction, based on the production of sodium hydroxide, only goes to about 85-90% completion due to such factors as the solubility of calcium carbonate, which increases as the hydroxyl ion content of the liquor increases, and extraneous factors such as time, temperature, lime application rate, purity, and liquor concentration, all of which affect causticization efficiency or acceleration.

It has been found, according to the present invention, that causticization of green liquor, or Kraft green liquor, to white liquor with lime is accelerated specially by any of three organic phosphonates; namely, nitrilotris(methylenephosphonic acid) (Dequest 2000); 2-phosphonobutane-1,2,4-tricarboxylic acid (Bayer PBS-AM); and hexamethylenediaminetetrakis(methylenephosphonic acid) (Nalco 7691/Dequest 2051). These compounds may be used as the free phosphonic acid and as the soluble alkali metal and ammonium salts thereof and the salts are included in the free acid definition for purposes of this invention. The dosage for these additives is 0.5-2% by weight based on the yield of calcium carbonate (theoretical) and a preferred dosage is about 1-2%.

It has been found that in mill these compounds increase the efficiency of a causticization reaction in a typical run from 83.0% to 86.5% at 1% dosage of additive. This increment of advantage may appear at first blush to be small, but in consideration of the thousands of tons of liquor passing through a paper mill, it engenders a considerable savings. This increment of advantage is about 3-4% with a 1% dosage of additive and about 2% with 0.5% additive calculated at a 30-minute time of reaction. The utilization of green liquor containing average or above average amounts of sodium sulfide does not change the enhancement of recovery shown by the figures above. (cf. Kobe and Wilkinson, ante.)

In recapitulation of the process, regeneration of sodium hydroxide pulping liquor is a vital facet of the alkaline kraft process. In kraft pulping, woodchips are digested at high temperature in liquor containing sodium hydroxide and sodium sulfide. Spent black liquor, which is separated from the pulp after digestion, is rich in organic material. Black liquor is concentrated and burned to give a smelt consisting primarily of sodium carbonate and sodium sulfide. This smelt is dissolved in water to give green liquor.

Green liquor is causticized with lime to give white liquor by the following reaction:

$$CaO + H_2O \rightarrow Ca(OH)_2$$

$$Ca(OH)_2 + Na_2CO_3 \rightarrow 2NaOH + CaCO_3 \downarrow$$

Sodium hydroxide is produced as product and calcium carbonate is separated from the white liquor and calcined to regenerate lime. The yield of sodium hydroxide from the reactions above is less than 100% and in mill practice efficiencies are in the range 75-90% and in more efficient plants from 85-90%.

EXAMPLES

General Reaction

The following laboratory procedure was utilized for the active compounds as well as those which were inactive or retarded acceleration of the reaction.

A stoichiometric amount of dry lime (CaO) was added to a stirred solution of sodium carbonate at 90°-95° C. The resultant slurry was held at 90°-95° C. for a specified time with mixing. The sample was removed from the water bath and allowed to settle for 5 or 10 minutes. Supernatant white liquor was drawn off and analyzed for $Na_2CO_3$, NaOH and $Na_2S$. Aqueous $Na_2CO_3$ (150 g/l) was used for initial screening. Additional studies employed in the research utilized a solution of $Na_2CO_3$ (100 g/l) and $Na_2S$ (35 g/l). Additives were always added before lime.

The resultant white liquor was titrated with 0.5N aqueous HCl to two or three sequential end points by a standard procedure (cf. TAPPI Method T624 53-68). This test, which includes formation of $BaCO_3$ in one step, is not invalidated by carryover of additives.

The first end point corresponded to $[NaOH]+\frac{1}{2}[Na_2S]$, the second to $[NaOH]+[Na_2S]$, and the third to $[NaOH]+[Na_2CO_3]+[Na_2S]$. With no sulfide in the system, only two end points were measured corresponding to [NaOH] and to $[NaOH]+[Na_2CO_3]$. The efficiency for the sulfide-free reactions was calculated as follows:

$$\text{efficiency} = \left(\frac{[NaOH]}{[NaOH] + [Na_2CO_3]}\right) \text{white liquor}$$

For the sulfide-containing liquor, the efficiency was calculated as:

$$\text{efficiency} = \left(\frac{[NaOH]}{[NaOH] + [Na_2CO_3]}\right) \text{white liquor}$$

$$\left(\frac{[NaOH]}{[NaOH] + [Na_2CO_3]}\right) \text{green liquor}$$

Rate studies (no treatment) showed the initial causticization to be very rapid followed by a slow increase. For sulfide-free liquor, conversion approached 91% at six hours. For the sulfide-containing system, conversion was about 89% at four hours. In both cases the reaction was over 80% complete at 30 minutes. For screening studies a reaction time of 30 minutes was selected.

A number of compounds were tested and only selected phosphonates gave a positive effect. These were nitrilotris(methylenephosphonic acid) (Dequest 2000), hexamethylenediaminetetrakis(methylenephosphonic acid) (Nalco 7691 or Dequest 2051), and 2-phosphonobutane-1,2,4-tricarboxylic acid (Bayer PBS-AM). All three increased efficiency by 3-4% when applied at 1.0% (active) based on theoretical yield of calcium carbonate and by about 2% when applied at 0.5%. These effects persisted to four hours reaction time at least. Triethanolamine triphosphate was slightly active.

In contrast, 1-hydroxyethylidenediphosphonic acid (Dequest 2010) and sodium poly($\alpha$-hydroxyacrylate) retarded causticization severely.

The following materials or classes of materials showed no activity:
  anionic surfactants (sulfonate and phosphate)
  nonionic surfactants
  citric and gluconic acids
  homo- and copolymers of acrylic acid
  EDTA and DTPA

EXAMPLE 1

Causticization Reaction

One hundred mls of 15% (w/v) aqueous $NaCO_3$ was volumetrically pipetted into an 8-ounce glass jar equipped with a magnetic mixer and plastic cap. The liner of the cap was removed since the alkaline liquor would leach acidic components from it. The loosely capped jar was placed in a water bath at 90°-95° F. and allowed to heat up. The jar was then placed on a small magnetic mixer and dry calcium oxide (7.92g) added with good mixing. The jar was immediately replaced in the hot water bath and held with mixing for a prescribed time. The jar was then removed and the contents allowed to settle for 10 minutes. About 20 ml of supernatant (white liquor) was drawn off for analysis.

When 100 ml $Na_2CO_3/Na_2S$ liquor was used, 5.28 g of calcium oxide was added. The slurry was allowed to settle for only five minutes before sampling.

Chemical additives were applied in either of two ways. Additive was weighed into the 8-ounce jar prior to addition of green liquor. In other instances, it was added as a concentrated solution to the hot green liquor just before calcium oxide addition. All additives were applied on an active chemical basis. Dose was calculated by weight relative to the theoretical yield of calcium carbonate.

EXAMPLE 2

Liquor Titration

Four ml of white liquor was volumetrically pipetted into a 150 ml beaker and diluted to about 50 ml with deionized water. With gentle mixing, 25 ml of 10% (w/v) aqueous $BaCl_2$ was added followed by three drops of phenolphthalein indicator solution. The slurry was titrated with 0.5N aqueous HCl to the colorless end point. The volume of titrant was recorded as A.

Four mls of 37% aqueous formaldehyde was added and the red color returned. After 30 seconds, the titration was continued to the second colorless end point. The total volume of titrant used to this point was recorded as B.

Three drops of Special Indicator Solution 260 was added and the titration continued to the salmon pink end point. The total volume of titrant was recorded as C.

The liquor composition was calculated from:
  A = 8([NaOH]+½[Na$_2$S]) in eg/l
  B = 8([NaOH]+[Na$_2$S]) in eg/l
  C = 8([NaOH]+[Na$_2$S]+[Na$_2$CO$_3$]) in eg/l
or
  [NaOH] = 0.125(2A-B)
  [Na$_2$S] = 0.25(B-A)
  [Na$_2$CO$_3$] = 0.125(C-B)

In titrating sulfide-free liquor, the second end point was omitted.

EXAMPLE 3

Table I

Rate Profiles of Conversion of Synthetic Green Liquors with No Treatment

| | Percent Conversion | |
|---|---|---|
| Time(hrs) | $Na_2CO_3$ (150g/l) | $Na_2CO_3$ (100g/l) + $Na_2S$ (35g/l) |
| 0.25 | — | 80.5 |
| 0.5 | 85.8 | 83.3 |
| 1.0 | 87.4 | 85.3 |
| 2.0 | 88.8 | 87.0 |
| 4.0 | 90.7 | 89.2 |
| 6.0 | 90.9 | — |

EXAMPLE 4

Table IIA

Dosage Profiles on Carbonate/Sulfide Solution

| Additive | Dose (%) | % Conversion |
|---|---|---|
| NONE | — | 83.0 |
| Nitrilotris(methylene-phosphonic acid) (Dequest 2000) | 0.1 | 83.5 |
| | 0.2 | 83.7 |
| | 0.5 | 85.4 |
| | 1.0 | 85.8 |
| 1-Hydroxyethylidene-diphosphonic acid (Dequest 2010) | 0.1 | 81.1 |
| | 0.2 | 81.1 |
| | 0.5 | 78.7 |
| | 1.0 | 56.5 |
| Hexamethylenediamine-tetrakis(methylene-phosphonic acid) (Nalco 7691/Dequest 2051) | 0.1 | 83.3 |
| | 0.2 | 83.4 |
| | 0.5 | 85.2 |
| | 1.0 | 86.5 |
| 2-Phosphonobutane-1,2,4-tricarboxylic acid (Bayer PBS-AM) | 0.1 | 83.6 |
| | 0.2 | 84.0 |
| | 0.5 | 85.0 |
| | 1.0 | 87.0 |
| Sodium poly(α-hydroxy-acrylate) | 0.1 | 82.0 |
| | 0.2 | 81.6 |
| | 0.5 | 78.8 |
| | 1.0 | 74.9 |

Table IIB

Rate Profiles for Treated Carbonate/Sulfide Liquor

| | | Percent Conversion | |
|---|---|---|---|
| Additive | Dose (%) | 2 hrs. | 4 hrs. |
| None | — | 86.8 | 87.2 |
| Hexamethylenediamine-tetrakis(methylene-phosphonic acid) (Nalco 7691) | 0.5 | 88.6 | 88.8 |
| Nitrilotris(methylene-phosphonic acid) (Dequest 2000) | 0.5 | 88.8 | 88.7 |
| 2-Phosphonobutane-1,2,4-tricarboxylic acid (Bayer PBS-AM) | 0.5 | 88.7 | 89.0 |

[1] Dosed as active chemical on theoretical yield of $CaCO_3$.

What is claimed is:

1. In the causticization conversion process of Kraft green liquor to white liquor by the reaction of calcium hydroxide and sodium carbonate yielding sodium hydroxide and calcium carbonate, the improvement which comprises using as an additive reagent to increase the causticization conversion of the Kraft green liquor one member of the group selected from nitrilotris(methylenephosphonic acid), 2-phosphonobutane-1,2,4-tricarboxylic acid, and hexamethylenediaminetetrakis(methylenephosphonic acid) in a dosage of 0.5-2.0 weight percent based on calcium carbonate (theoretical).

2. The process according to claim 1 wherein the additive reagent is utilized in a dosage of 1.0-2.0 weight percent based on calcium carbonate (theoretical).

3. The process according to claim 1 wherein the additive reagent is hitrilotris(methylenephosphonic acid).

4. The process according to claim 1 wherein the additive reagent is 2-phosphonobutane-1,2,4-tricarboyxlic acid.

5. The process according to claim 1 wherein the additive reagent is hexamethylenediaminetetrakis(methylenephosphonic acid).

* * * * *